United States Patent [19]

Ingalsbe

[11] Patent Number: 5,332,397
[45] Date of Patent: Jul. 26, 1994

[54] TEST CORD APPARATUS

[75] Inventor: David L. Ingalsbe, Hastings, Minn.

[73] Assignee: Independent Technologies, Inc., Eagan, Minn.

[21] Appl. No.: 5,230

[22] Filed: Jan. 15, 1993

[51] Int. Cl.[5] ............................................. H01R 23/00
[52] U.S. Cl. ..................................... 439/76; 439/456; 439/680; 439/922
[58] Field of Search ...................... 439/67, 76, 77, 493, 439/188, 912, 456, 458, 676, 680, 922; 379/21, 22, 26, 27, 28, 332, 326

[56] References Cited

U.S. PATENT DOCUMENTS

| | | | |
|---|---|---|---|
| 2,018,134 | 10/1935 | Kollath | 439/458 |
| 3,692,966 | 9/1972 | Lancaster | 439/61 |
| 4,493,951 | 1/1985 | Sanderson et al. | 439/676 |
| 4,878,848 | 11/1989 | Ingalsbe | 439/76 |
| 4,968,260 | 11/1990 | Ingalsbe | 439/76 |
| 5,199,878 | 8/1993 | Dewey et al. | 379/332 |

Primary Examiner—Neil Abrams
Attorney, Agent, or Firm—Joel D. Skinner

[57] ABSTRACT

A telecommunications adapter for connecting a modular connector to the mating end of a telecommunications interface adapter comprises a modular connection structure; a printed circuit board having exposed electrical contacts disposed within the plane of the printed circuit board which are electrically connected to the modular connection structure; and a housing structure having a central cavity enclosing a predetermined portion of the printed circuit board, the housing structure further having a plug end for mating contact with the telecommunications interface terminal and which has an aperture through which the electrical contacts of the printed circuit board outwardly extend for electrical connection with the telecommunications interface terminal.

17 Claims, 2 Drawing Sheets

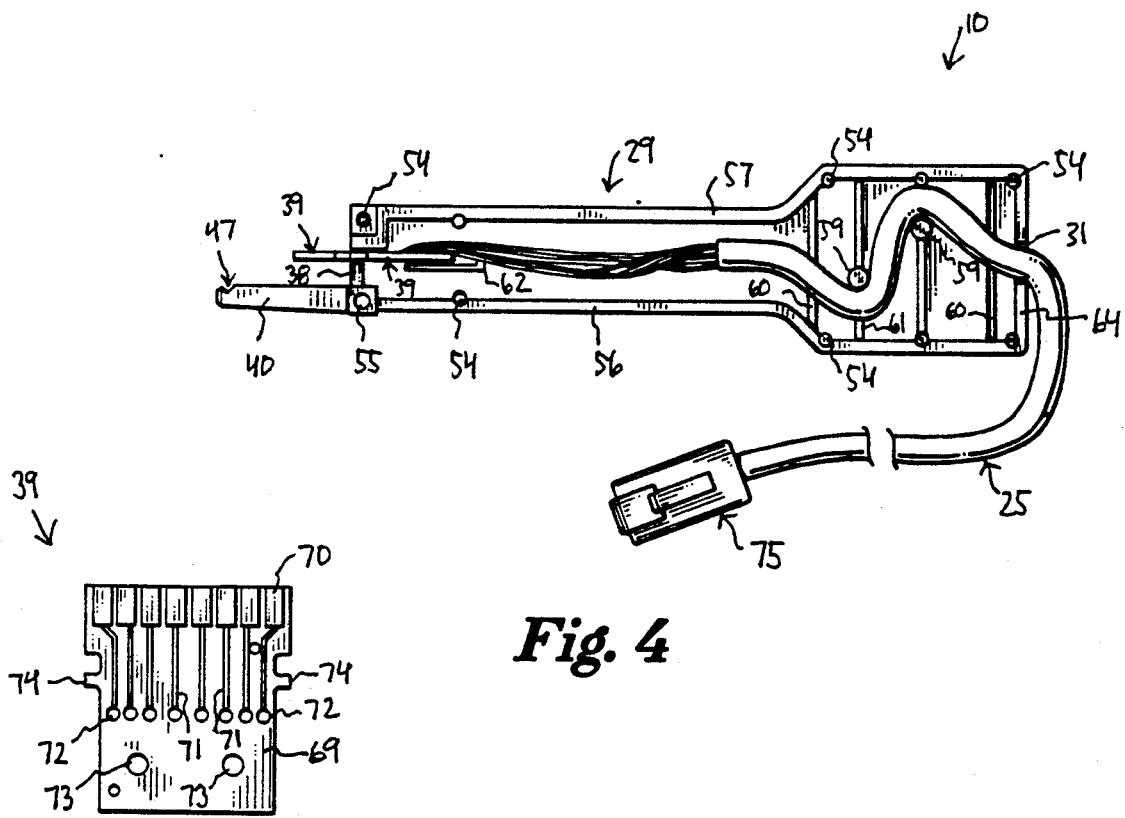
Fig. 4
Fig. 5
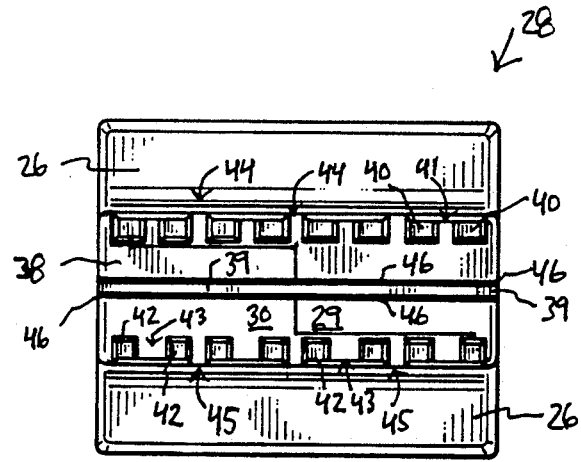
Fig. 6

TEST CORD APPARATUS

BACKGROUND

This invention relates to electrical connector apparatus and more particularly to an electrical adapter for use in the telephone industry. The device of this invention is particularly useful for adapting or connecting a telephone industry 110-T type block or interface terminal to a modular plug for test purposes.

Under existing telecommunications industry practice, telephone networks in certain areas are required to have a disconnect means or point associated with each pair of conductors comprising a typical telephone line. Test equipment may then be connected at this point. An appropriate structure for providing such a configuration is the 110-T type block manufactured by ATT. The use of this block or terminal has created a need for an adapter or connector for establishing an electrical connection with the block. Prior art connectors or adapters are either unable or unsuited to provide such electrical connections.

Despite the need in the art for a telecommunications adapter which overcomes the shortcomings and limitations of the prior art, none insofar as is known has been developed or proposed. Accordingly, it is an object of the present invention to provide an adapter for use with a 110-T type block. It is a further object of this invention to provide an adapter which establishes and maintains reliable electrical connections with telecommunications interfaces. Another object of this invention is to provide a adapter which is durable, easy to use, economical to manufacture, and which overcomes the limitations and shortcoming of the prior art.

SUMMARY OF THE INVENTION

The apparatus of the present invention provides a unitary and compact telecommunications interface adapter which is particularly suited for use with a 110-T type block or interface terminal. The adapter of this invention provides a means of electrically connecting and adapting a 110-T block to a modular plug or jack for testing and other purposes.

The telecommunications adapter for connecting a modular connector to the mating end of a telecommunications interface adapter comprises modular connection means; a printed circuit board having exposed electrical contacts disposed within the plane of the printed circuit board and which are electrically connected to the modular connection means; and a housing structure having a central cavity enclosing a predetermined portion of the printed circuit board, the housing structure further having a plug end for mating contact with the telecommunications interface terminal and which has an aperture through which the electrical contacts of the printed circuit board outwardly extend for electrical connection with the telecommunications interface terminal.

Preferably, the housing structure has vertical and horizontal axis, and the housing structure is a bifurcated structure with first and second fused halves divided primarily along the vertical axis. The modular connection means preferably comprises a cord having a plurality of individual conductors connected to the printed circuit board, and a modular plug connected to the cord conductors. And, the printed circuit board further comprises a generally rectangular, non-conductive matrix, the electrical contacts being a plurality of conductive metallic members disposed along both sides of one edge of the matrix, the metallic members each having a conductive lead extending therefrom, embedded within the matrix, and terminating in a cord conductor connection point disposed at a predetermined point on the matrix.

The plug end preferably comprises a distal face disposed adjacent the housing interior cavity and on which the plug end aperture is disposed, and a plurality of elongated mating prongs extending longitudinally outwardly from the distal face and arranged in two spacially parallel rows separated a predetermined distance, the plug end aperture being oriented spacially parallel and centered between the two prong rows. The plug end prongs are each spaced laterally from each other a predetermined distance in the prong rows, and the prongs have longitudinally oriented mating slots centrally disposed therein. Finally, the prongs preferably have laterally and inwardly oriented mating notches disposed at their outwardly extended ends.

These and other benefits of this invention will become clear from the following description by reference to the drawings.

BRIEF DESCRIPTION OF THE DRAWINGS

FIG. 4 is a side view of the interior of the adapter apparatus shown in FIG. 3.

FIG. 5 is a top plan view of the printed circuit board connection structure of the adapter apparatus.

FIG. 6 is a frontal view of the adapter apparatus.

DESCRIPTION OF THE PREFERRED EMBODIMENT

The apparatus of the present invention is usable to adapt a telecommunications block or interface, and particularly a 110-T type block, to a modular plug. The 110-T blocks are connected to and terminate telephone company lines at the customer premises. This termination typically occurs at either the entrance cable leading into the premises or, for example in the case of a multiple story building, at the end of a riser cable extending from the entrance cable (typically located on the ground floor) to an upper floor. The 110-T block provides multiple connections for customer supplied telecommunications equipment (customer premises equipment) and the like.

Figure 1:
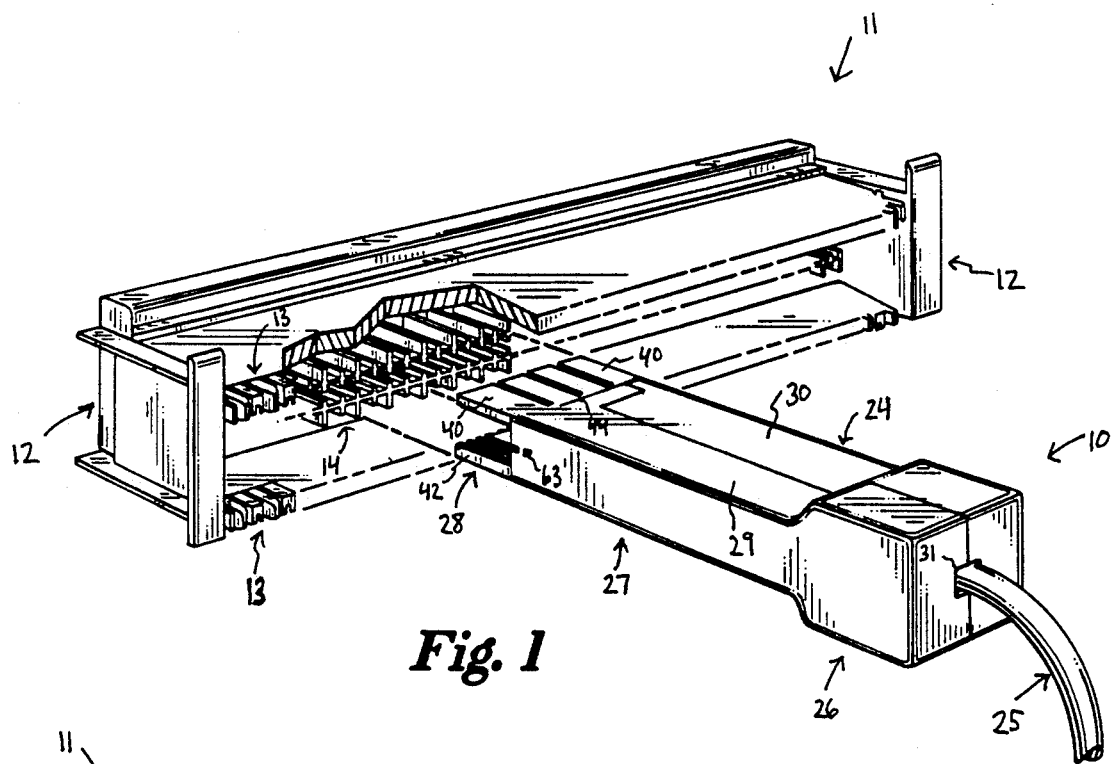
FIG. 1 is a perspective view of the adapter apparatus of the present invention in an operative orientation for connection with a telecommunications interface terminal.
Figure 2:
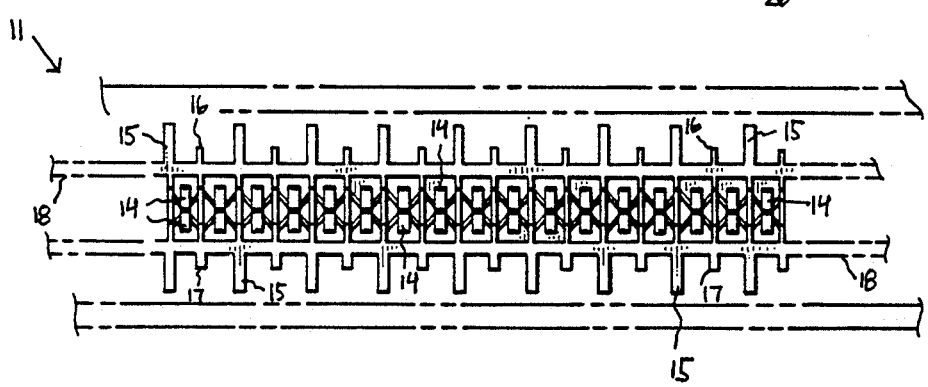
FIG. 2 is a detailed frontal view of the connection interface of the telecommunications interface terminal shown in FIG. 1.

Referring to FIGS. 1 and 2, the 110-T block, produced by ATT, is a modular system for cross-connecting pairs of telephone wires in residential and commercial buildings. The block system 11 includes multiple connector assemblies or segments 13 which are connectable in horizontal, spacially parallel, and aligned rows to a snap holder or base 12 which is typically mounted on a wall of a utility closet or to a distributing frame. Although the block 11 is shown to have two sets or rows of connective structures 13, block structures having additional rows and/or related hardware are also known and suited for use with the adapter structure of this invention. The parallel rows of connector segments 13 are separated by a horizontally parallel row of disconnect contacts 14. The disconnect contacts 14 comprise pairs of upper and a lower spring type contacts which are normally urged in contact with each other. Electrical contact between the upper and lower contacts 14 is broken or disconnected by inserting an object between the contacts and allowing their spring type structure to move apart, thus creating a disconnect condition in the telephone line or lines associated with that particular contact pair 14 or group of pairs. Each pair of contacts 14 has a vertically oriented major alignment post 15 disposed above and below it to one side, and vertically oriented minor alignment posts 16 and 17 disposed above and below it to its other side. The uppermost oriented minor alignment posts 16 are shown to have a slightly smaller width or thickness than that of the lower minor alignment posts 17 in order to provide a differential mating configuration which is utilized by the adapter apparatus 10 of this invention for passive alignment purposes. Both the major and minor alignment posts 15, 16 and 17 are disposed from structural horizontal members 18 disposed above and below the contact 14 rows.

Figure 3:
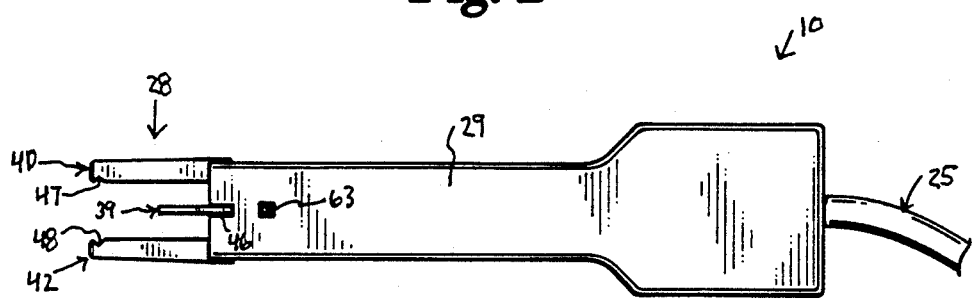
FIG. 3 is a side view of the adapter apparatus of this invention.

Referring still to FIG. 1, the unitary adapter apparatus 10 of this invention is shown in a position for connection to the 110-T block 11. Referring also to FIGS. 3 and 4, the adapter 10 is shown to basically comprise a compact and somewhat elongated body 24 and an attached cord 25. The adapter body 24 is approximately 4.5 inches long, 1 inch high and 1 inch wide, and weighs approximately 1 pound. The body 24 has a generally square proximal end 26, from which extends the cord 25, an elongated and generally rectangular mid segment 27, and a distal connection end 28. The proximal end 26 has an aperture 31 through which the cord 25 extends. Additionally, the body 24 is shown to have a bifurcated structure consisting of first and second halves 29 and 30 which are divided primarily along the vertical axis of the body 24. The vertically oriented body joint is further arranged so that extended connective members located at the plug end of the body 24, described further below, are grouped together in two lateral rows, each linked to a single body half 29 or 30, divided along the horizontal plane of the adapter 10. This structure orients the body joint out of line with primary stress points which typically develop during use of the device 10, to diminish the potential for cracks to develop in the body 24. The two halves 29 and 30 are preferably coupled via sonic welding or the like during manufacturing. The body 24 is preferably constructed of a rigid plastic material such as a polycarbonate. In addition to the structural advantages this housing structure 24 configuration provides, the method of assembly is efficient and easy to manufacture.

The cord 25 is preferably a stranded, approximately 24 gauge cord, such as a D8AU data cord known in the art. As shown in FIG. 4, a modular plug 75, such as an RJ45 modular plug, is connected to the extended end of the cord 25. This plug 75 is connectable to various local area network test sets, via a modular jack, as is also known in the art.

Still referring to FIG. 4, the body 24 is further configured to have a hollow interior cavity which encloses and supports the cord 25 as well as a printed circuit board (PCB) 39. In FIG. 4, the interior side of the first half 29 of the body 24 is shown. The second half 30 of the body 24 is substantially a mirror image of the first half 29 with certain particular exceptions which are specified below. The top face 56, bottom face 57 and end face 64 of the first half 29 mate with equivalent structures of the second half 30 when the body 24 is operatively connected. The interior side of the side face 58 of the first half 29 is also shown. A plurality of male-type coupling structures or posts 54 are shown disposed on the periphery of the mating edge of the first half 29. These posts 54 mate with aligned, complimentary female-type coupling holes located on the second half 30 of the body 24 to secure the coupled body 24 together. A female-type coupling hole 55 is shown disposed near the distal connection end 28 of the apparatus 10. This hole 55 mates with an aligned, complimentary male-type coupling post located on the second half 30 of the body 24, also for alignment and securement purposes. A pair of strain relief posts 59 are shown disposed laterally from the side face 58 of the body first half 29. The posts 59 extend from structural ribs 61 disposed on the side face 58. These posts 59 mate with aligned, complimentary post structures on the body second half 30 to form a unitary strain relief structure. The cord 25 is shown wrapped between the posts 59 at an angle such that the cord 25 is crimped when a longitudinally directed pulling force is exerted on the cord 25. The posts 59 function to secure the cord 25 in a fixed position within the interior cavity of the body 24 during use and further function to stabilize the coupled body structure 24. Also disposed on the body 24 interior cavity are strain relief walls 60. The walls 60 extend laterally inwardly from the side face 58 a predetermined distance. The walls 60 are aligned with identical walls on the body second half 30, which also extend laterally into the body 24 interior cavity a predetermined distance such that a space or gap is formed, and between which the cord 25 extends. The width of the strain relief wall gap is slightly less than the diameter of the cord 25 so that the cord 25 is further frictionally held in place and is prevented from longitudinal displacement by pulling or pushing forces exerted on the cord 25 during normal use.

Referring to FIGS. 4 and 5, the printed circuit board 39 is shown disposed in the interior cavity of the body 24 proximate the connection end 28. The PCB 39 partially extends to the exterior of the connection end 28. Also shown on the interior of the body cavity are a PCB support ledge 62 and a PCB alignment aperture 63. Identical structures are located on the second half 30 of the body 24. The support ledge 62 is a shallow U-shaped protrusion from the side wall 58 which supports the top, bottom and back ends of the PCB 39 and stabilizes it against both vertical and longitudinal movement during use. The alignment aperture 63, as is best shown in FIG. 3, is disposed in the side face 58 of the body 24 and mates with a prong 74 on the PCB 39 to align the PCB 39 in a proper operative orientation. The PCB 39 is a planar, generally rectangular structure comprising a non conductive matrix 69 having a plurality of double sided conductive contacts 70, each of which has a conductive lead 71 extending therefrom to a wire connection aperture 72. The contacts 70 are generally rectangular and disposed along the distal or outwardly extended edge of the PCB 39, each separated from one another a predetermined distance corresponding to the separation distance between the contacts 14 of the 110-T block 11. The contacts 70 are preferably gold plated nickel for reliable electrical connectability. The leads 71 are connected to the back edges of the contacts 70 and are embedded in the non conductive matrix 69.

The wire connection apertures 72 provide solder connections between the leads 71 and the individual conductor strands of the cable 25. A pair of strain relief apertures 73 are disposed in the PCB 39. The cable 25 conductors preferably extend through the apertures 73 (not shown) which thereby secure the conductors and stabilize the solder connections with the connection apertures 72. A pair of alignment notches 74 are disposed on the sides of the PCB 39, proximate the connection end. These tabs 74 mate with alignment apertures 63 on the body 24 to adjust the position of the PCB 39 for proper electrical connection with the block 11.

Referring also to FIG. 6, the overall structure of the plug or connection end 28 of the adapter 10 is designed to provide a stable and reliable electrical connection to a 110-T block 11 which is easy and quick to initiate or terminate. The plug end 28 basically comprises a plurality of upper and lower alignment prongs 40 and 42 which are arranged in two spacially parallel rows separated by an interspace. The upper and lower alignment prongs 40 and 42 are further aligned with one another in pairs. The interspace has vertical and horizontal dimensions generally coextensive with those of the 110-T block 11 segment to which the adapter 10 is connected. Thereby, the extension of the connection prongs 40 and 42 over the top and bottom surfaces of the inserted 110-T block restricts vertical movement of the adapter 10 and thus increases connection stability. The prongs 40 and 42 extend from top and bottom edges of the distal end of the body 24 internal cavity, and which defines a distal face 38. An elongated laterally oriented extension slot 46 is disposed in the distal face 38. A predetermined segment of the PCB 39, which includes the contacts 70, extends through the extension slot 46 and into the interspace between the upper and lower prongs 40 and 42. In addition to the interspace between the upper and lower prongs 40 and 42, interspaces 44 exist between each of the upper prongs 40, and interspaces 45 exist between each of the lower prongs 42. A longitudinally and inwardly oriented generally rectangular slot 41 is disposed in each upper prong 40, and a similar slot 43 is disposed in each lower prong 42. The width of the lower prong slots 43 is slightly greater than the width of the upper prong slots 41 for block alignment purposes. Finally, a laterally and inwardly oriented notch 47 having a generally V-shaped cross-section is disposed adjacent the end of each upper alignment prong 40, while a similar notch 48 (shown in FIG. 3) is disposed in each lower alignment prong 42.

When the connection end 28 of the adapter 10 is operatively connected to the 110-T block 11, the major alignment posts 15 of block 11 are inserted between the inter-prong spaces 44 and 45 of the adapter end 28. The upper minor alignment posts 16 of the block 11 are inserted in the longitudinal upper prong slots 41 of the plug end 28, and the lower minor alignment posts 17 are inserted in the lower prong slots 43. The remaining inwardly disposed surfaces of the upper and lower prongs 40 and 42 are in frictional contact with the horizontal member 18 of the block 11, while the laterally disposed sides of the prongs 40 and 42 are frictionally fitted between adjacent major alignment posts 15 of the block 11. The contacts 70 of the PCB 39 are inserted between and force apart the contact pairs 14 of the block 11 to create a disconnect condition in the associated telephone lines. The upper contact 70 mates with the upper contact 14, and the aligned lower contact 70 is communicatively connected to the lower contact 14.

When connected, the block 11 telephone line circuits are routed or isolated through the adapter 10 to ancillary equipment.

In summary, the adapter 10 of this invention is connected directly to a 110-T type block as shown in FIG. 1, by inserting the plug end 28 on the block 11 as previously discussed. Modular connections are then made via the plug 75. The modular connections provided by the adapter 10 allow a user to conveniently test or monitor telephone equipment from the block 11 as required in certain areas. It can be used to test new cable installations or to isolate problems in existing telephone service. The adapter embodiment 10 shown in the drawings is usable with four pair telecommunications line systems. However, the teachings of this invention may be utilized to provide adapters usable with alternative line configurations such as common one, two and 25-pair lines. Importantly, the adapter 10 is unitary and compact; thus multiple adapters may be used simultaneously on a single 110-T block 11.

As many changes are possible to the embodiments of this invention utilizing the teachings thereof, the descriptions above, and the accompanying drawings should be interpreted in the illustrative and not the limited sense.

That which is claimed is:

1. A telecommunications adapter for connecting a modular connector to the mating end of a telecommunications interface terminal, comprising:
   a. modular connection means;
   b. a printed circuit board having exposed electrical contact disposed within the plane of the printed circuit board which are electrically connected to said modular connection means; and
   c. a housing structure having a central cavity enclosing a predetermined portion of said printed circuit board, said housing structure further having a plug end for mating contact with the telecommunications interface terminal and which comprises an aperture through which said electrical contacts of said printed circuit board outwardly extend for electrical connection with the telecommunications interface terminal, said plug end further comprising a distal face adjacent said housing interior cavity and on which said plug end aperture is disposed, and a plurality of elongated mating prongs extending longitudinally outwardly from said distal face and arranged in two spacially parallel rows separated a predetermined distance, said plug end aperture being oriented spacially parallel and centered between said two prong rows.

2. The adapter of claim 1, wherein said modular connection means comprises a cord having a plurality of individual conductors connected to said printed circuit board, and a modular plug connected to said cord conductors.

3. The adapter of claim 2, wherein said printed circuit board further comprises a generally rectangular, nonconductive matrix, said electrical contacts being a plurality of conductive metallic members disposed along one edge of said matrix, said metallic members each having a conductive lead extending therefrom, embedded within said matrix, and terminating in a solder connection point disposed at a predetermined point on said matrix.

4. The adapter of claim 3, wherein said printed circuit board further comprises at least one strain relief aperture and at least one alignment and stabilization member.

5. The adapter of claim 1, wherein said housing structure has vertical and horizontal axis, and wherein said housing structure is a bifurcated structure with first and second fused halves divided primarily along said vertical axis.

6. The adapter of claim 5, wherein said fused halves are joined via an ultrasonic fusion process.

7. The adapter of claim 6, wherein said housing structure is constructed of a polycarbonate.

8. The adapter of claim 1, wherein said housing structure plug end is constructed and arranged to mate with a 110-T type telecommunications interface terminal.

9. The adapter of claim 8 wherein said elongated mating prongs of said plug end are each spaced laterally from each other a predetermined distance in said prong rows, wherein said prongs have longitudinally oriented mating slots centrally disposed therein, and wherein said prongs each have laterally and inwardly oriented mating notches disposed at their outwardly extended ends.

10. The adapter of claim 9, wherein said prong mating slots in one said row of prongs have a first predetermined width, and said prong mating slots in the second said row of prongs have a second predetermined width which is greater than said second predetermined width.

11. The adapter of claim 1, wherein said housing interior cavity further comprises printed circuit board stabilization means.

12. The adapter of claim 2, wherein said housing interior cavity further comprises strain relief means operative on said modular connection means.

13. The adapter of claim 1, wherein said modular connection means comprises a cord having a plurality of individual conductors connected to said printed circuit board, and a modular plug connected to said cord conductor, and wherein said printed circuit board further comprises a generally rectangular, non-conductive matrix, said electrical contacts being a plurality of conductive metallic members disposed along one edge of said matrix, said metallic members each having a conductive lead extending therefrom, embedded within said matrix, and terminating in a solder connection point disposed at a predetermined point on said matrix.

14. The adapter of claim 13, wherein said plug end comprises a distal face adjacent said housing interior cavity and on which said plug end aperture is disposed, and a plurality of elongated mating prongs extending longitudinally outwardly from said distal face and arranged in two spacially parallel rows separated a predetermined distance, said plug end aperture being oriented spacially parallel and centered between said two prong rows, wherein said plug end prongs are each spaced laterally from each other a predetermined distance in said prong rows, wherein said prongs have longitudinally oriented mating slots centrally disposed therein, wherein said prongs further have laterally and inwardly oriented mating notches disposed at their outwardly extended ends, and wherein said prong mating slots in one said row of prongs have a first predetermined width, and said prong mating slots in the second said row of prongs have a second predetermined width which is greater than said second predetermined width.

15. The adapter of claim 1, wherein the adapter is usable for adapting a 110-T type block to a four pair telephone modular jack.

16. A telecommunications adapter for connecting a modular connector to the mating end of a 110-T type telecommunications interface terminal, comprising:
 a. modular connection means;
 b. a printed circuit board having exposed electrical contacts disposed within the plane of the printed circuit board which are electrically connected to said modular connection manes; and
 c. a housing structure having a central cavity enclosing a predetermined portion of said printed circuit board, said housing structure further having a plug end for mating contact with the telecommunications interface terminal and which comprises an aperture through which said electrical contact means of said printed circuit board outwardly extend for electrical connection with the telecommunications interface terminal for isolation purposes, a distal face adjacent said housing interior cavity and on which said plug end aperture is disposed, and a plurality of elongated mating prongs extending longitudinally outwardly from said distal face and arranged in two spacially parallel rows separated a predetermined distance, said plug end aperture being oriented spacially parallel and centered between said two prong rows, said housing structure further having vertical and horizontal axis, and wherein said housing structure is a bifurcated structure with first and second fused halves divided primarily along said vertical axis.

17. A telecommunications adapter for connecting a modular connector to the mating end of a 110-T type telecommunications interface terminal, comprising:
 a. a cord having a plurality of individual conductors and further having a modular plug connected to said cord conductors;
 b. a printed circuit board having exposed electrical contacts disposed within the plane of the printed circuit board which are electrically connected to said cord conductors; and
 c. a housing structure having a central cavity enclosing a predetermined portion of said printed circuit board, said housing structure further having a plug end for mating contact with the telecommunications interface terminal and which comprises an aperture through which said electrical contact means of said printed circuit board outwardly extend for electrical connection with the telecommunications interface terminal, a distal face adjacent said housing interior cavity and on which said plug end aperture is disposed, and a plurality of elongated mating prongs extending longitudinally outwardly from said distal face and arranged in two spacially parallel rows separated a predetermined distance, said plug end aperture being oriented spacially parallel and centered between said two prong rows, said housing structure further having vertical and horizontal axis, and wherein said housing structure is a bifurcated structure with first and second fused halves divided primarily along said vertical axis.

* * * * *